United States Patent
Han et al.

(10) Patent No.: US 9,497,128 B2
(45) Date of Patent: Nov. 15, 2016

(54) SERVICE RATE CONTROL METHOD, SYSTEM AND DEVICE

(71) Applicant: Huawei Technologies Co., Ltd., Shenzhen, Guangdong (CN)

(72) Inventors: Guanglin Han, Shenzhen (CN); Jian Zhang, Shenzhen (CN); Huadong Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 14/451,020

(22) Filed: Aug. 4, 2014

(65) Prior Publication Data

US 2014/0341021 A1    Nov. 20, 2014

Related U.S. Application Data

(63) Continuation of application No. PCT/CN2013/070748, filed on Jan. 21, 2013.

(30) Foreign Application Priority Data

Feb. 9, 2012    (CN) .......................... 2012 1 0028461

(51) Int. Cl.
*G01R 31/08*    (2006.01)
*H04L 12/851*    (2013.01)
*H04L 12/24*    (2006.01)

(52) U.S. Cl.
CPC ....... *H04L 47/2425* (2013.01); *H04L 41/5025* (2013.01)

(58) Field of Classification Search
CPC ...................................................... H04L 47/10
USPC ...................................................... 370/230
See application file for complete search history.

(56) References Cited

U.S. PATENT DOCUMENTS

| | | | | |
|---|---|---|---|---|
| 2010/0135229 | A1* | 6/2010 | Lohr | H04W 72/1284 370/329 |
| 2012/0140665 | A1 | 6/2012 | Li et al. | |
| 2013/0294403 | A1* | 11/2013 | Srinivasan | H04W 36/165 370/331 |

FOREIGN PATENT DOCUMENTS

| | | |
|---|---|---|
| CN | 101448201 A | 6/2009 |
| CN | 101583159 A | 11/2009 |
| CN | 101588326 A | 11/2009 |
| CN | 101690315 A | 3/2010 |
| CN | 101778434 A | 7/2010 |
| CN | 101998531 A | 3/2011 |
| EP | 1986455 A1 | 10/2008 |
| WO | WO 2004091151 A1 | 10/2004 |

* cited by examiner

*Primary Examiner* — Samina Choudhry
(74) *Attorney, Agent, or Firm* — Leydig, Voit & Mayer, Ltd.

(57) ABSTRACT

The present invention provides a service rate control method, system and device. The method includes: receiving, by a PGW, a PCC rule sent by a PCRF, wherein the PCC rule includes a service data flow identifier, a QCI and an ARP; and determining whether the PCC rule satisfies a new bearer establishment condition, if the PCC rule satisfies the new bearer establishment condition, establishing a first bearer according to the QCI and the ARP, and binding a service data flow corresponding to the service data flow identifier to the first bearer. The present invention solves the problem that rates of some service data flows will exceed their own GBRs continuously due to service characteristics, thereby leading a QoS of other service data flow sharing a same bearer as the service data flow cannot be satisfied, thus ensuring the degree of user experience.

19 Claims, 2 Drawing Sheets

SERVICE RATE CONTROL METHOD, SYSTEM AND DEVICE

CROSS-REFERENCE TO RELATED APPLICATIONS

This application is a continuation of International Patent Application No. PCT/CN2013/070748, filed on Jan. 21, 2013, which claims the priority of Chinese Application No. 201210028461.0, filed on Feb. 9, 2012, both of which are hereby incorporated by reference in their entireties.

TECHNICAL FIELD

The present invention relates to communication technologies, and particularly, relates to a service rate control method, system and device.

BACKGROUND

A quality of service (QoS) control mechanism using bearer as granularity is provided in an evolved packet system (EPS). A service data flow of a user is transmitted between a UE and a service server through a bearer established in the EPS. The EPS provides an available bandwidth for the service data flow by using bearer as granularity, to ensure a guaranteed transmission rate of a service and limit a highest transmission rate of the service.

Figure 1:
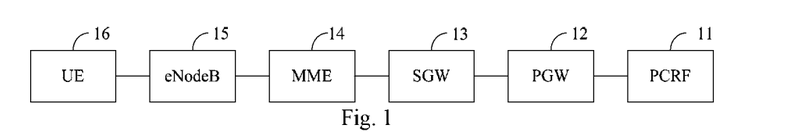
FIG. 1 is a simplified block diagram of the EPS which a bearer binding is based on in prior art.

FIG. 1 is a simplified block diagram of the EPS which a bearer binding is based on in prior art. As shown in FIG. 1, the EPS which the bearer binding is based on includes a policy and charging rules function (PCRF) 11, a packet data network gateway (PGW) 12, a serving gateway (SGW) 13, a mobility management entity (MME) 14, an evolved nodeB (eNodeB) 15 and a user equipment (UE) 16.

A specific implementation of the bearer binding is as follows. The PGW 12 receives a policy and charging control (PCC) rule sent by the PCRF 11, and according to a QoS class identifier (QCI) and an allocation and retention priority (ARP) in the PCC rule, binds a service data flow corresponding to the current PCC rule to an existing bearer with same value as the QoS and the ARP, or establishes a new bearer for the current service data flow corresponding to the PCC rule. When the service data flow corresponding to the current PCC rule is bound to the existing bearer with a same value as the QCI and the ARP, the PGW 12 initiates a bearer modification flow to the SGW 13, namely to modify the existing bearer for bearing the service data flow corresponding to the current PCC rule. The SGW 13 continuously executes a modification program according to a modification message from the PGW 12. The MME 14 receives a modification message sent by the SGW 13 and continuously executes the modification program. The eNodeB 15 receives a modification message sent by the MME 14 and continuously executes the modification program. The UE 16 receives a modification message sent by the eNodeB 15 and continuously executes the modification program. When establishing a new bearer for the service data flow corresponding to the current PCC rule, the PGW 12 initiates a bearer establishment flow to the SGW 13 to establish the new bearer. The SGW 13 continuously executes a bearer establishment according to a bearer establishment message from the PGW 12. The MME 14 receives a bearer establishment message sent by the SGW 13 and continuously executes the bearer establishment. The eNodeB 15 receives a bearer establishment message sent by the MME 14 and continuously executes the bearer establishment, and the UE 16 receives a bearer establishment message sent by the eNodeB 15 and continuously executes the bearer establishment.

However, when two service data flows share a same bearer, a guaranteed bit rate (GBR) of a first service data flow is GBR1, a GBR of a second service data flow is GBR2, and a guaranteed rate of the bearer is GBR1+GBR2, a rate of the first service data flow may continuously exceed GBR1 due to a service characteristic (for example, the first service data flow is a video service), thereby leading that a rate of the second service data flow cannot reach GBR2. As a result, a QoS of the second service data flow cannot be satisfied, thereby decreasing a degree of user experience.

SUMMARY

Embodiments of the present invention provide a service rate control method, system and device, to improve the degree of user experience.

In a first aspect, a method for processing a service data flow is provided, comprising:

receiving, by a PGW, a PCC rule sent by a PCRF, wherein the PCC rule comprises a service data flow identifier, a QCI and an ARP; and determining, by the PGW, whether the PCC rule satisfies a new bearer establishment condition, and if the PCC satisfies the new bearer establishment condition, establishing a first bearer according to the QCI and the ARP, and binding a service data flow corresponding to the service data flow identifier to the first bearer.

In a second aspect, a method for processing a service data flow is provided, comprising:

determining, by a PCRF, whether service information corresponding to a received a service data flow satisfies a rate control condition;

if the PCRF determines that the service information corresponding to the service data flow satisfies the rate control condition, configuring, by the PCRF, a PCC rule corresponding to the service data flow to make the configured PCC rule satisfy a new bearer establishment condition; and sending, by the PCRF, the configured PCC rule to a PGW, for the PGW to process the service data flow according to the configured PCC rule.

In a third aspect, a method for processing a service data flow is provided, comprising:

obtaining a first bearer and a service parameter corresponding to the first bearer; and performing a rate control process on a rate of a service data flow in the first bearer according to the service parameter.

In a fourth aspect, a PGW is provided, comprising:

a receiving module, configured to receive a PCC rule sent by a PCRF, wherein the PCC rule comprises a service data flow identifier, a QCI and an ARP;

a determining module, configured to determine whether the PCC rule satisfies a new bearer establishment condition;

a bearer establishing module, configured to establish, when the determining module determines that the PCC rule satisfies the new bearer establishment condition, a first bearer according to the QCI and the ARP; and a binding module, configured to bind a service data flow corresponding to the service data flow identifier to the first bearer.

In a fifth aspect, a PCRF is provided, comprising:

a determining module, configured to determine whether service information corresponding to a received service data flow satisfies a rate control condition;

a configuring module, configured to configure, if the determining module determines that the service information corresponding to the service data flow satisfies the rate control condition, a PCC rule corresponding to the service data flow to make a configured PCC rule satisfy a new bearer establishment condition; and a sending module, configured to send the configured PCC rule to a PGW for the PGW to process the service data flow according to the configured PCC rule.

In a sixth aspect, a QoS execution device is provided, comprising:

a receiving module, configured to obtain a first bearer and a service parameter corresponding to the first bearer; and a rate control processing module, configured to respectively perform a rate control process on a rate of service data flow in the first bearer according to the service parameter.

In a seventh aspect, a service rate control system is provided, comprising: an above-mentioned PGW and an above-mentioned PCRF.

In an eighth aspect, a service rate control system is provided, comprising a PGW, a PCRF, and an above-mentioned QoS execution device.

Whether a received PCC rule sent by a PCRF satisfies a new bearer establishment condition is determined, and if the new bearer establishment condition is satisfied, it means a rate of the service data flow will continuously exceeds its own GBR due to a service characteristic. In order to avoid that a QoS of other service data flow sharing a same bearer with the service data flow cannot be satisfied, the first bearer is established according to the QCI and the ARP in the PCC rule, and the service data flow corresponding to the service data flow identifier in the PCC rule is bound to the first bearer, thereby ensuring the degree of user experience.

DESCRIPTION OF EMBODIMENTS

Figure 2:
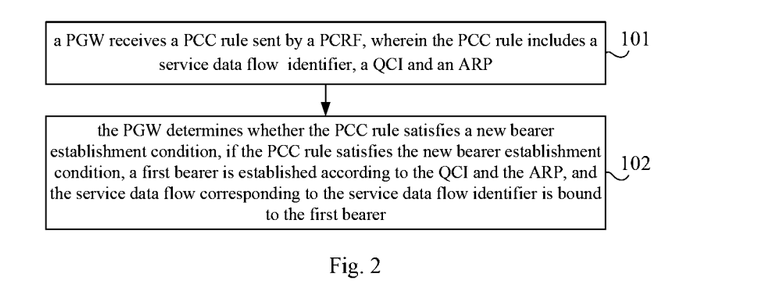
FIG. 2 is a flow diagram of an embodiment of a method for processing a service data flow in the present invention.

FIG. 2 is a flow diagram of an embodiment of a method for processing a service data flow of the present invention. As shown in FIG. 2, the method of this embodiment includes following steps.

Step 101: a PGW receives a PCC rule sent by a PCRF, wherein the PCC rule includes a service data flow identifier, a QCI and an ARP.

In this embodiment, a PCRF first determines whether service information in a service data flow satisfies a rate control condition. Wherein, the rate control condition may include one or more of the followings: a specific service type for establishing a new bearer, a specific transmission mechanism for establishing a new bearer and a specific transmission protocol for establishing a new bearer. Specifically, the specific service type may include one or more of the followings: a video service type, an audio service type, a real-time video type, an interactive video type, a video-on-demand service type and the like. The specific transmission mechanism may include one or more of the followings: a dynamic adaptive streaming over hyper text transfer protocol (HTTP) (DASH is abbreviation of the dynamic adaptive streaming over HTTP), a progressive download and the like. The specific transmission protocol may include one or more of the followings: a hyper text transfer protocol (HTTP), a real-time transport protocol (RTP) and the like.

In addition, in this embodiment, the service information may include one or more of the followings: a service type, a transmission mechanism and a transmission protocol. When one of the service type, the transmission mechanism and the transmission protocol in the service information in the service data flow satisfies the rate control condition, for example, when the service type in the service information is a video service type, a QoS of other service data flow sharing a bearer may be affected. Then a PCC rule corresponding to the service data flow is configured to make the configured PCC rule satisfy a new bearer establishment condition. That is to say, the configured PCC rule is sent to a PGW when it is ensured that the PGW will establish a new bearer for the service data flow. When each service type of the service information in the service data flow does not satisfy the rate control condition, a PCC rule corresponding to the data flow is directly sent to the PGW.

Step 102: the PGW determines whether the PCC rule satisfies a new bearer establishment condition, if the PCC rule satisfies the new bearer establishment condition, a first bearer is established according to the QCI and the ARP, and the service data flow corresponding to the service data flow identifier is bound to the first bearer.

In this embodiment, the data flow may represent a single data flow, and it may also represent a cluster of data flows. Namely, a set consists of a plurality of data flows.

In addition, the PGW initiates a bearer establishment flow to a SGW to establish the first bearer. The SGW continuously executes the first bearer establishment according to a bearer establishment message from the PGW. An MME receives a bearer establishment message sent by the SGW and continuously executes the first bearer establishment. An eNodeB receives a bearer establishment message sent by the MME and continuously executes the first bearer establishment.

In this embodiment, whether a received PCC rule sent by a PCRF satisfies a new bearer establishment condition is determined, and if the new bearer establishment condition is satisfied, it means a rate of the service data flow will continuously exceeds its own GBR due to a service characteristic. In order to avoid that QoS of other service data flows sharing a same bearer with the service data flow cannot be satisfied, the first bearer is established according to the QCI and the ARP in the PCC rule, and the service data flow corresponding to the service data flow identifier in the PCC rule is bound to the first bearer, thereby ensuring the degree of user experience.

Furthermore, in another embodiment of the present invention, based on the embodiment shown in FIG. 2, when service information in a PCRF service data flow satisfies a rate control condition, a specific QCI and/or a specific ARP for establishing a new bearer is (are) configured in a PCC rule corresponding to the service data flow. The specific QCI and/or the specific ARP may be a QCI and/or an ARP used for establishing the new bearer, which is pre-agreed by the PCRF and a PGW together, and a different QCI and/or a different ARP may also be selected according to the QCI and/or the ARP previously configured for the PCC rule.

The configured PCC rule is sent to the PGW, and then a specific implementation of the above-mentioned step 102 is as follows.

The PGW determines whether the QCI is the same as the specific QCI and/or the ARP is the same as the specific ARP. If the QCI is the same as the specific QCI and/or the ARP is the same as the specific ARP, a first bearer is established according to the QCI and the ARP, and a service data flow corresponding to the service data flow identifier is bound to the first bearer.

In addition, it should be noted that when a PGW determines that the QCI is different from the specific QCI and the ARP is also different from the specific ARP, the query about whether there is a bearer with a same value as the QCI and the ARP is performed. If it is determined that there is a bearer with a same value as the QCI and the ARP, the bearer with a same value as the QCI and the ARP is configured as a second bearer, and the service data flow corresponding to the service data flow identifier is bound to the second bearer. If it is determined that there is not a bearer with the same value as the QCI and the ARP, a new bearer is established according to the QCI and the ARP, and the service data flow corresponding to the service data flow identifier is bound to the new bearer.

Furthermore, in another embodiment of the present invention, based on the embodiment shown in FIG. 2, when service information in a PCRF service data flow satisfies a rate control condition, a specific indication identifier is configured in a PCC rule corresponding to the service data flow, the specific indication identifier is configured as a specific indication identifier of an establishment of a new bearer, and the configured PCC rule is sent to a PGW. Then another specific implementation of step 102 is as follows.

The PGW determines whether a specific indication identifier is also included in the PCC rule, and determines whether the specific indication identifier is a specific indication identifier of an establishment of a new bearer. If it is determined that the PCC rule includes a specific indication identifier and the specific indication identifier is a specific indication identifier of an establishment of a new bearer, a first bearer is established according to the QCI and the ARP, and a service data flow corresponding to the service data flow identifier is bound to the first bearer.

In this embodiment, for example, a specific indication identifier is configured in the PCC rule corresponding to a service data flow by a PCRF, the specific indication identifier may be a Boolean mathematical value. When the Boolean value is "True", it represents a specific indication identifier of an establishment of a new bearer; and when the Boolean value is "False", it represents a non specific indication identifier of an establishment of a new bearer. Then, when a PGW receives a PCC rule, the PGW determines whether a Boolean value is included in the PCC rule and determines that the Boolean value is "True" or "False". If it is "True", a first bearer is established according to the QCI and the ARP in the PCC rule. If it is "False", the query about whether there is a bearer with the same value as the QCI and the ARP is performed. If it is determined that there is a bearer with the same value of the QCI and the ARP, the bearer with the same value as the QCI and the ARP is configured as a second bearer, and a service data flow corresponding to the service data flow identifier is bound to the second bearer. If there is not a bearer with the same value as the QCI and the ARP, a new bearer is established according to the QCI and the ARP, and a service data flow corresponding to the service data flow identifier is bound to the new bearer.

Figure 3:
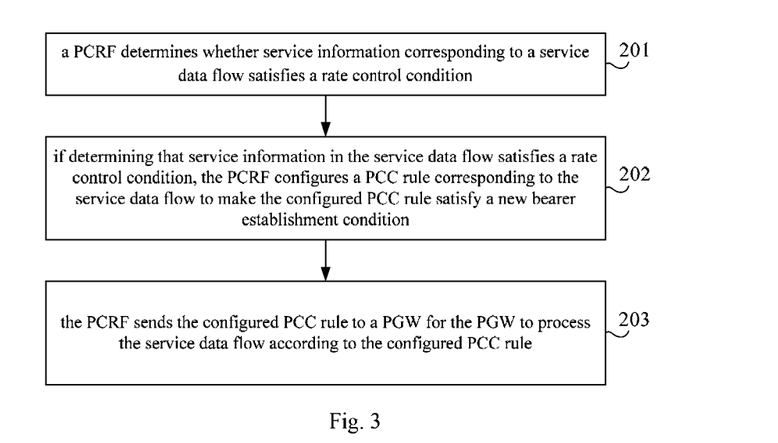
FIG. 3 is a flow diagram of another embodiment of a method for processing a service data flow in the present invention.

FIG. 3 is a flow diagram of another embodiment of a method for processing a service data flow of the present invention. As shown in FIG. 3, the method of this embodiment includes following steps.

Step 201: a PCRF determines whether service information corresponding to a service data flow satisfies a rate control condition.

Wherein, the rate control condition may include one or more of the followings: a specific service type for establishing a new bearer, a specific transmission mechanism for establishing a new bearer and a specific transmission protocol for establishing a new bearer. Specifically, the specific service type may include one or more of the followings: a video service type, an audio service type, a real-time video type, an interactive video type, a video-on-demand service type and the like. The specific transmission mechanism may include one or more of the followings: a DASH, a progressive download and the like. The specific transmission protocol may include one or more of the followings: a HTTP, a RTP and the like. In addition, the service information may include one or more of the followings: a service type to which a service belongs, a transmission mechanism adopted by a service, a transmission protocol, an MBR and a GBR.

Step 202: if determining that service information in the service data flow satisfies a rate control condition, the PCRF configures a PCC rule corresponding to the service data flow to make the configured PCC rule satisfy a new bearer establishment condition.

Step 203, the PCRF sends the configured PCC rule to a PGW for the PGW to process the service data flow according to the configured PCC rule.

In this embodiment, the working principle of the PGW is the same as that of an embodiment shown in the above-mentioned method, which will not described redundantly herein. In addition, when at least one of a service type, a transmission mechanism and a transmission protocol in service information of a service data flow satisfies a rate control condition, for example, when the service type is a video service type, a QoS of other service data flow sharing a bearer may be affected. Then a PCC rule corresponding to the service data flow is configured, so that the configured PCC rule satisfies a new bearer establishment condition. That is to say, the configured PCC rule is sent to a PGW when it is ensured that the PGW will establish a new bearer for the service data flow. When each service type of service information in a service data flow does not satisfy a rate control condition, a PCC rule corresponding to the data flow is directly sent to a PGW.

In this embodiment, a PCRF configures a PCC rule corresponding to a service data flow through determining that service information in the service data flow satisfies a rate control condition to make the configured PCC rule satisfy a new bearer establishment condition, and sends the configured PCC rule to a PGW for the PGW to establish a new bearer for the service data flow according to the configured PCC rule, consequently avoiding that a QoS of other service data flow sharing a same bearer with the service data flow cannot be satisfied, thereby ensuring the degree of user experience.

Furthermore, in another embodiment of the present invention, based on the embodiment shown in FIG. 3, a specific implementation of configuring a PCC rule corresponding to a service data flow in step 202 may be specified as follows.

A specific QCI and/or a specific ARP for establishing a new bearer is (are) configured in a PCC rule corresponding to the service data flow.

Wherein, the specific QCI and/or the specific ARP may be a reserved QCI and/or a reserved ARP, which is pre-agreed by a PCRF and a PGW and which is used for establishing a new bearer. Or the specific QCI and/or the specific ARP may be a QCI and/or an ARP different from the QCI and/or the ARP previously configured for a PCC rule.

Furthermore, in another embodiment of the present invention, based on the embodiment shown in FIG. 3, another specific implementation of configuring a PCC rule corresponding to a service data flow in step 202 may be specified as follows.

A specific indication identifier is configured in a PCC rule corresponding to the service data flow, and the specific indication identifier is configured as a specific indication identifier of establishing a new bearer.

In this embodiment, the specific indication identifier may be a Boolean value; when the Boolean value is "True", it represents a specific indication identifier of an establishment of a new bearer; and when the Boolean value is "False", it represents a non specific indication identifier of an establishment of a new bearer.

Figure 4:
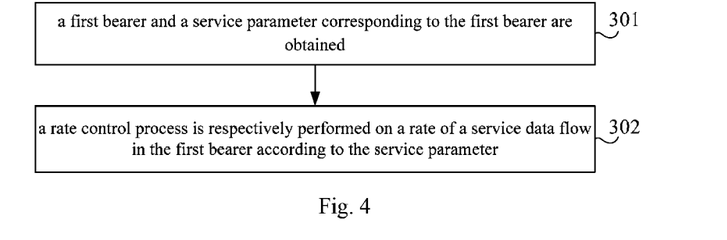
FIG. 4 is a flow diagram of a further embodiment of a method for processing a service data flow in the present invention.

FIG. 4 is a flow diagram of another embodiment of a method for processing a service data flow of the present invention. As shown in FIG. 4, an execution body of this embodiment is a QoS execution device. Then the method includes the following steps.

Step 301: a first bearer and a service parameter corresponding to the first bearer are obtained.

In this embodiment, a PGW receives a PCC rule, and according to a QCI and an ARP in the PCC rule, binds a service data flow corresponding to the current PCC rule to an existing bearer with the same value as the QCI and the ARP, or establishes a new bearer for the service data flow corresponding to the current PCC rule. When the service data flow corresponding to the current PCC rule is bound to an existing bearer with the same value as the QCI and the ARP, the PGW initiates a bearer modification message carrying a service parameter to an SGW, namely to modify the existing bearer for bearing the service data flow corresponding to the current PCC rule, and to receive the service parameter. The SGW continuously executes a modification program according to a bearer modification message from the PGW. An MME receives a bearer modification message carrying the service parameter, which is sent by the SGW, and continuously executes the modification program. An eNodeB receives a bearer modification message carrying the service parameter, which is sent by the MME, and continuously executes the modification program. A UE receives a bearer modification message carrying the service parameter, which is sent by the eNodeB, and continuously executes the modification program. When establishing a new bearer for the service data flow corresponding to the current PCC rule, the PGW initiates a bearer establishment message carrying the service parameter to a SGW to establish the new bearer. The SGW continuously executes a bearer establishment according to the bearer establishment message from the PGW and receives the service parameter. An MME receives a bearer establishment message carrying the service parameter, which is sent by the SGW, and continuously executes the bearer establishment. An eNodeB receives a bearer establishment message carrying the service parameter, which is sent by the MME and continuously executes the bearer establishment. A UE receives a bearer establishment message carrying the service parameter, which is sent by the eNodeB, and continuously executes the bearer establishment. Wherein, the service parameter may include one or more of the followings: service information, a QCI, an ARP, a traffic flow template (TFT), a service data flow identifier and the like. The service information includes one or more of the followings: a service type, a transmission mechanism, a transmission protocol, an MBR and a GBR.

In addition, in this embodiment, the QoS execution device may be an eNodeB, a UE or the like. When the QoS execution device is an eNodeB, the eNodeB receives a bearer modification message or a bearer establishment message sent by an MME, obtains a first bearer, and receives a service parameter corresponding to the first bearer through a SGW and the MME, which is sent by a PGW. When the QoS execution device is a UE, the UE receives a bearer modification message or a bearer establishment message sent by an eNodeB, obtains a first bearer, and receives a service parameter corresponding to the first bearer through a SGW, an MME and the eNodeB, which is sent by the PGW.

Step 302: a rate control process is respectively performed on a rate of a service data flow in the first bearer according to the service parameter.

In this embodiment, the service data flow in the first bearer may be part of service data flows in the first bearer, or all of service data flows in the first bearer.

In this embodiment, through respectively performing a rate control process on a rate of the service data flow in the first bearer according to the obtained first bearer and service parameter corresponding to the first bearer, establishing a new bearer for a service data flow which can cause that a QoS of other service data flow sharing a same bearer as the service data flow cannot be satisfied, the degree of user experience is thereby ensured.

Furthermore, in another embodiment of the present invention, based on the embodiment shown in FIG. 4, when a rate control condition corresponding to the first bearer is obtained, a service parameter include service information, a QCI, an ARP and a TFT, and the service information includes one or more of the followings: a service type, a transmission mechanism and a transmission protocol, one specific implementation of step 302 may be as follows.

In the first bearer, a service data flow corresponding to the TFT is identified, and whether service information corresponding to the service data flow satisfies a rate control condition is determined respectively.

A second bearer is established respectively according to a QCI and an ARP corresponding to a service data flow satisfying a rate control condition and the service data flow is bound to the second bearer.

In this embodiment, the rate control condition may include one or a combination of the followings: a specific service type for establishing a new bearer, a specific transmission mechanism for establishing a new bearer and a specific transmission protocol for establishing a new bearer. Specifically, the service type may include one or more of the followings: a video service type, an audio service type, a real-time video type, an interactive video type, a video-on-demand service type and the like. The transmission mechanism may include one or more of the followings: being carried on DASH, Progressive Download and the like. The transmission protocol may include one or more of the followings: HTTP, RTP and the like.

For example, in this embodiment, when at least one of a service type, a transmission mechanism and a transmission protocol in service information of a service data flow satisfies a rate control condition, for example, when the service type is a video service type, a QoS of other service data flow sharing a bearer may be affected. Then a second bearer is established according to a QCI and an ARP corresponding to the service data flow, and a TFT corresponding to the service data flow is bound to the second bearer.

Furthermore, in another embodiment of the present invention, based on the embodiment shown in FIG. 4, when the service parameter includes service information and a TFT, and the service information includes a GBR, another specific implementation of step 302 is as follows.

In the first bearer, a service data flow corresponding to the TFT is identified. Whether a rate corresponding to the service data flow is larger than a GBR corresponding to the service data flow is determined respectively. And a rate corresponding to a service data flow whose rate is larger than a GBR is configured as a GBR corresponding to the service data flow.

In this embodiment, a rate corresponding to the service data flow may also be configured by adopting a token bucket algorithm or a leaky bucket algorithm in this method.

In addition, when there is a spare bandwidth resource in the first bearer, the method further includes:

allocating the spare bandwidth resource to at least one configured data flow whose GBR is smaller than an MBR.

In this embodiment, in order to ensure a QoS of each service data flow in a bearer, a QoS execution device identifies a service data flow corresponding to a TFT, obtains a rate corresponding to the service data flow, and determines whether the rate is larger than a GBR corresponding to the service data flow. If the rate is larger than the GBR corresponding to the service data flow, the rate is configured as the GBR, namely that a transmission of part data equivalent to the GBR in the service data flow is guaranteed in priority. If the rate corresponding to the service data flow is smaller than or equal to the GBR corresponding to the service data flow, a transmission of all data of the service data flow is guaranteed.

In addition, it should be noted that a service parameter may also include an MBR, and if a guaranteed rate of a bearer is larger than the sum of rates of all service data flows in the bearer, a rate of a service data flow continuously exceeding its GBR may be improved, wherein the improved rate is ensured to be smaller than or equal to the MBR of the service data flow and the sum of the improved rate and rates of other service data flows is smaller than or equal to the guaranteed rate of the bearer. For example, a guaranteed rate of a first bearer is 3M, and the first bearer includes two service data flows: a first service data flow and a second service data flow specifically, wherein, the rate of the first service data flow is 2.5M, and the GBR of the first service data flow is 2M; and the rate of the second service data flow is 0.5M, the GBR of the second service data flow is 1M. Then the rate of the first service data flow, which is 2.5 M, is larger than its GBR, and then the rate of the first service data flow is configured as 2M. Because the rate of the second service data flow, which is 0.5M, is smaller than its GBR, the rate of the second service data flow is still 0.5M. In this case, because the guaranteed rate of the bearer is greater than the sum of the rates of the first service data flow and the second service data flow, the rate of the first service data flow can be improved to 2.5M, which is smaller than the MBR corresponding to the first service data flow. And the sum of the improved rate of the first service data flow and the rate of the second service data flow is equal to the guaranteed rate of the bearer.

The embodiment of the present invention provide a service rate control method, system and device, to solve the problem that rates of some service data flows will continuously exceeds their own GBRs due to a service characteristic, thus leading that QoSs of other service data flows sharing a same bearer with the service data flows cannot be satisfied, thereby ensuring the degree of user experience.

Figure 5:
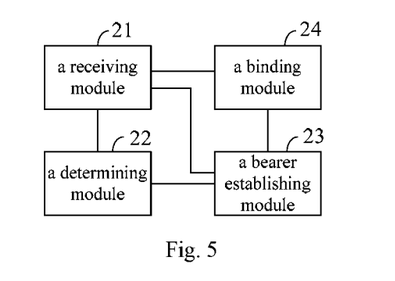
FIG. 5 is a simplified block diagram of an embodiment of a PGW of the present invention.

FIG. 5 is a simplified block diagram of an embodiment of a PGW of the present invention. As shown in FIG. 5, the PGW of this embodiment includes: a receiving module 21, a determining module 22, a bearer establishing module 23 and a binding module 24. The receiving module 21 is configured to receive a PCC rule sent by a PCRF, wherein the PCC rule includes a service data flow identifier, a QCI and an ARP. The determining module 22 is configured to determine whether the PCC rule satisfies a new bearer establishment condition. The bearer establishing module 23 is configured to establish a first bearer according to the QCI and the ARP when the determining module 22 determines that the PCC rule satisfies the new bearer establishment condition. The binding module 24 is configured to bind a service data flow corresponding to the service data flow identifier to the first bearer.

The PGW of this embodiment can execute the technical solution of the embodiment of the method shown in FIG. 2, the principle thereof is similar, which will not described redundantly herein.

In this embodiment, whether a received PCC rule sent by a PCRF satisfies a new bearer establishment condition is determined. If the new bearer establishment condition is satisfied, it means the rate of the service data flow will continuously exceed its own GBR due to a service characteristic. In order to avoid that QoS of other service data flows sharing a same bearer with the service data flow cannot be satisfied, the first bearer is established according to a QCI and an ARP in the PCC rule, and the service data flow corresponding to the service data flow identifier in the PCC rule is bound to the first bearer, thereby ensuring the degree of user experience.

Furthermore, in another embodiment of the present invention, based on the embodiment shown in FIG. 5, when service information in a PCRF service data flow satisfies a rate control condition, a specific QCI and/or a specific ARP is (are) configured in a PCC rule corresponding to the service data flow. The specific QCI and the specific ARP may be a QCI and/or an ARP previously agreed by a PCRF and a PGW, it may also be a QCI and/or an ARP selected by the PCRF, which is (are) different from the QCI and/or the ARP previously configured for the PCC rule. And the configured PCC rule is sent to a PGW, and the determining module 22 is specifically configured to determine whether the QCI is the same as the specific QCI and/or the ARP is the same as the specific ARP.

The PGW may further include: a querying module, configured to query whether there is a bearer with the same value as the QCI and the ARP if the determining module 22 determines that both the QCI and ARP are different from the specific QCI and ARP. Then the bearer establishing module 23 is further configured to configure a bearer with the same value as the QCI and the ARP as a second bearer if the querying module determines there is a bearer with the same value as the QCI and the ARP.

In addition, the bearer establishing module 23 is further configured to establish the first bearer according to the QCI and the ARP if the querying module determines that there is not a bearer with the same value as the QCI and the ARP. The binding module 24 is further configured to bind a service data flow corresponding to the service data flow identifier to the first bearer.

Furthermore, in another embodiment of the present invention, based on the embodiment shown in FIG. 5, when service information in a PCRF service data flow satisfies a rate control condition, a specific indication identifier is configured in a PCC rule corresponding to the service data flow, the specific indication identifier is configured as a specific indication identifier of establishing a new bearer, and the configured PCC rule is sent to a PGW. Then the determining module 22 is specifically configured to determine whether the specific indication identifier is included in the PCC rule and determine whether the specific indication identifier is a specific indication identifier of establishing a new bearer.

The PGW may further include: a querying module, configured to determine whether there is a bearer with the same value as the QCI and the ARP if the determining module 22 determines that the PCC rule does not include the specific indication identifier or it includes the specific indication identifier but the specific indication identifier is not a specific indication identifier for establishing the new bearer. Then the bearer establishing module 23 is further configured to configure the bearer with the same value as the QCI and the ARP as a second bearer if the querying module determines that there is a bearer with the same value as the QCI and the ARP. The binding module 24 is further configured to bind the service data flow corresponding to the service data flow identifier to the second bearer.

In addition, the bearer establishing module 23 is further configured to establish a first bearer according to the QCI and the ARP if the querying module determines that there is not a bearer with the same value as the QCI and the ARP. The binding module 24 is further configured to bind the service data flow corresponding to the service data flow identifier to the first bearer.

Figure 6:
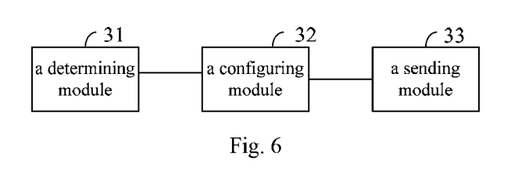
FIG. 6 is a simplified block diagram of an embodiment of a PCRF of the present invention.

FIG. 6 is a simplified block diagram of an embodiment of a PCRF of the present invention. As shown in FIG. 6, the PCRF of this embodiment includes: a determining module 31, a configuring module 32 and a sending module 33, wherein, the determining module 31 is configured to determine whether received service information corresponding to a service data flow satisfies a rate control condition. The configuring module 32 is configured to, if the determining module 31 determines that service information corresponding to the service data flow satisfies a rate control condition, configure a PCC rule corresponding to the service data flow to make the configured PCC rule satisfy a new bearer establishment condition. The sending module 33 is configured to send the configured PCC rule to a PGW for the PGW to process the service data flow according to the configured PCC rule.

The PCRF of this embodiment may execute the technical solution of the embodiment of the method shown in FIG. 3. The implementation principle thereof is similar, which will not be described redundantly herein.

In this embodiment, the PGW may be the one in the embodiment shown in FIG. 5, which will not be described redundantly herein. In addition, when at least one of a service type, a transmission mechanism and a transmission protocol in service information of a service data flow satisfies a rate control condition, for example, when the service type is a video service type, QoS of other service data flows sharing the bearer may be affected. Then a PCC rule corresponding to the service data flow is configured to make the configured PCC rule satisfy a new bearer establishment condition. Namely, the configured PCC rule is sent to the PGW after it is ensured that the PGW will establish a new bearer for the service data flow. When each service type of service information in the service data flow does not satisfy a rate control condition, the PCC rule corresponding to the data flow is directly sent to the PGW.

In this embodiment, through the PCRF determining that service information in a service data flow satisfies a rate control condition, configuring a PCC rule corresponding to the service data flow so that the configured PCC rule satisfies a new bearer establishment condition, and sending the configured PCC rule to a PGW for the PGW to establish a new bearer for the service data flow according to the configured PCC rule, that QoS of other service data flows sharing a same bearer as the service data flow cannot be satisfied is thus avoided, and the degree of user experience is thereby ensured.

Furthermore, in another embodiment of the present invention, based on the embodiment shown in FIG. 6, the configuring module 32 is specifically configured to configure a specific QCI and/or a specific ARP for establishing a new bearer in a PCC rule corresponding to a service data flow if the determining module 31 determines that a rate control condition is satisfied.

Wherein, the specific QCI and the specific ARP may be a QCI and/or an ARP previously agreed by a PCRF and a PGW or a QCI and/or an ARP selected by a PCRF, which is different from the QCI and/or the ARP previously configured for the PCC rule.

Furthermore, in another embodiment of the present invention, based on the embodiment shown in FIG. 6, the configuring module 32 is specifically configured to configure a specific indication identifier in a PCC rule corresponding to a service data flow if the determining module 31 determines that a rate control condition is satisfied, and configures the specific indication identifier as a specific indication identifier for establishing a new bearer.

In this embodiment, the specific indication identifier may be a Boolean value. When the Boolean value is "True", it represents a specific indication identifier of establishing a new bearer. When the Boolean value is "False", it represents a non specific indication identifier of establishing a new bearer.

Figure 7:
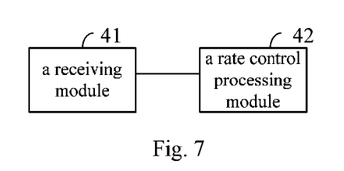
FIG. 7 is a simplified block diagram of an embodiment of a QoS execution device of the present invention.

FIG. 7 is a simplified block diagram of an embodiment of a QoS execution device of the present invention. As shown in FIG. 7, the QoS execution device of this embodiment includes: a receiving module 41 and a rate control processing module 42. The receiving module 41 is configured to obtain a first bearer and a service parameter corresponding to the first bearer. The rate control processing module 42 is configured to respectively perform a rate control process on a rate of service data flow in the first bearer according to the service parameter.

The QoS execution device of this embodiment may execute a technical solution of the embodiment of the method shown in FIG. 4. The implementation principle thereof is similar, which will not be described redundantly herein.

In this embodiment, through respectively performing, according to a obtained first bearer and a service parameter corresponding to the first bearer, a rate control process on a rate of a service data flow in the first bearer, and establishing a new bearer for a service data flow which may cause that a QoS of other service data flow sharing a same bearer as the service data flow cannot be satisfied, the degree of user experience is thus ensured.

Furthermore, in another embodiment of the present invention, based on the embodiment shown in FIG. 7, when the service parameter include service information, a QCI, an ARP and a TFT and the service information includes one or more of the followings: a service type, a transmission mechanism and a transmission protocol, the rate control processing module 42 includes a first identifying unit, a first determining unit, a bearer establishing unit and a binding unit. The first identifying unit is configured to identify service data flows corresponding to the TFT in the first bearer. The first determining unit is configured to respectively determine whether service information corresponding to the service data flows satisfies a rate control condition. The bearer establishing unit is configured to respectively establish second bearers according to the QCIs and ARPs corresponding to service data flows satisfying a rate control condition. The binding unit is configured to bind the service data flows to the second bearers corresponding to the service data flows.

In this embodiment, a rate control condition may include one or more of the followings: a service type, a transmission mechanism and a transmission protocol. Specifically, the service type may include one or more of the followings: a video service type, an audio service type, a real-time video type, an interactive video type, a video-on-demand service type and the like. The transmission mechanism may include one or more of the followings: DASH, Progressive Download and the like. The transmission protocol may include one or more of the followings: HTTP, RTP and the like.

In addition, in this embodiment, the service information may include one or more of the followings: a service type, a transmission mechanism and a transmission protocol. When at least one of a service type, a transmission mechanism and a transmission protocol in service information in the service data flow satisfies a rate control condition, for example, when the service type is a video service type, QoS of other service data flows sharing a bearer may be affected. Then, a second bearer is established according to the QCI and ARP corresponding to the service data flow, and the service data flow is bound to the second bearer.

Furthermore, in another embodiment of the present invention, based on the embodiment shown in FIG. 4, when the service parameter includes service information and a TFT, and the service information includes a GBR, the rate control processing module 42 includes a second identifying unit, a second determining unit and a configuring unit. The second identifying unit is configured to identify a service data flow corresponding to the TFT in the first bearer. The second determining unit is configured to respectively determine whether the rate corresponding to the service data flow is larger than a GBR corresponding to the service data flow. The configuring unit is configured to configure a rate corresponding to a service data flow whose rate is larger than a GBR as the GBR corresponding to the service data flow.

In addition, the rate control processing module 42 may further include: an allocating unit, configured to allocate a spare bandwidth resource to at least one configured data flow whose GBR is smaller than an MBR.

In this embodiment, in order to ensure a QoS of each service data flow in a bearer, a QoS execution device identifies a service data flow corresponding to a TFT, obtains a rate corresponding to the service data flow, and determines whether the rate is larger than a GBR corresponding to the service data flow. If that it is larger is determined, the rate is configured as the GBR. In addition, it should also be noted that the service parameter may further include an MBR. If a guaranteed rate of a bearer is larger than the sum of rates of all service data flows in a bearer, a rate of a service data flow continuously exceeding its own GBR may be improved, wherein the improved rate is ensured to be smaller than or equal to the MBR of the service data flow, and the sum of the rate thereof and rates of other service data flows is smaller than or equal to the guaranteed rate of the bearer. For example, a guaranteed rate of a first bearer is 3M, and the first bearer includes two service data flows: a first service data flow and a second service data flow specifically. The rate of the first service data flow is 2.5M, and the GBR of the first service data flow is 2M. The rate of the second service data flow is 0.5M, the GBR of the second service data flow is 1M. Then the rate of the first service data flow, which is 2.5M, is larger than its GBR, then the rate of the first service data flow is configured as 2M. Because the rate of the second service data flow, which is 0.5M, is smaller than its GBR, the rate of the second service data flow is still 0.5M. In this case, because the guaranteed rate of the bearer is larger than the sum of rates of the first service data flow and the second service data flow, the rate of the first service data flow can be improved to 2.5M which is smaller than the MBR corresponding to the first service data flow, and the sum of the improved rate of the first service data flow and the rate of the second service data flow is equal to the guaranteed rate of the bearer.

In addition, it should be noted that when a QoS execution device is a base station, the base station configures, after the base station configures a second bearer, the parameter corresponding to the second bearer to UE, wherein the parameter may include a bearer identifier, a priority and the like.

The present invention provides a service rate control system, including a PGW and a PCRF. The PGW may be a PGW in the embodiment shown in FIG. 5, the PCRF may be a PCRF in the embodiment shown in FIG. 6. The principles thereof are similar, which will not be described redundantly herein.

The present invention further provides a service rate control system, including a PGW, a PCRF and a QoS execution device. The QoS execution device may be a PCRF in the embodiment shown in FIG. 7. The principle thereof is similar, which will not be described redundantly herein.

It should be understood for those of ordinary skill in the art that: all or part of steps to realize embodiments of each of the above-mentioned method may be completed by hardware relevant to program instructions. The aforementioned program may be stored in a computer readable storage medium. When the program is executed, steps which include that of embodiments of each of the above-mentioned method are executed. The aforementioned storage medium includes various media capable of storing program codes, such as a ROM, a RAM, a magnetic disk, an optical disk or the like.

Finally, it should be noted that, the preceding embodiments are merely used for illustrating rather than limiting technical solutions of the present invention. Though the present invention is illustrated in detail by referring to each of the preceding embodiments, it should be understood for those of ordinary skill in the art that modifications may still be made on a technical solution recorded in respective embodiments mentioned above, or equivalent substitutions may be made to part of or all of technical features thereof. These modifications or substitutions do not make the nature of relevant technical solutions depart from the scope of the technical solution of the respective embodiments of the present invention.

What is claimed is:

1. A method for processing a service data flow, comprising:
   obtaining a first bearer and a service parameter corresponding to the first bearer; and
   performing, by a processing hardware platform, a rate control process on a rate of the service data flow in the first bearer according to the service parameter,
   wherein if a rate control condition corresponding to the first bearer is obtained, the service parameter comprises service information, a quality of service class identifier (QCI), an allocation and retention priority (ARP), and a traffic flow template (TFT), and the service information comprises one or more of the followings: a service type, a transmission mechanism, and a transmission protocol, then the performing the rate control process on the rate of the service data flow in the first bearer according to the service parameter comprises:
   identifying, by the processing hardware platform, the service data flow corresponding to the TFT in the first bearer, and determining whether the service information corresponding to the service data flow satisfies the rate control condition; and
   establishing, by the hardware processing platform, a second bearer according to the QCI and the ARP corresponding to the service data flow satisfying the rate control condition and binding the service data flow satisfying the rate control condition to the second bearer,
   wherein the rate control condition comprises one or more of the followings: a specific service type for establishing a new bearer, a specific transmission mechanism for establishing the new bearer, and a specific transmission protocol for establishing the new bearer.

2. A method for processing a service data flow, comprising:
   obtaining a first bearer and a service parameter corresponding to the first bearer; and
   performing a rate control process on a rate of the service data flow in the first bearer according to the service parameter,
   wherein if the service parameter comprises service information and a traffic flow template (TFT), and the service information comprises a guaranteed bit rate (GBR), then the performing the rate control process on the rate of the service data flow in the first bearer according to the service parameter comprises:
   identifying the service data flow corresponding to the TFT in the first bearer; and
   determining whether a rate corresponding to the service data flow is larger than the GBR corresponding to the service data flow, and if the rate corresponding to the service data flow is larger than the GBR corresponding to the service data flow, configuring the rate corresponding to the service data flow as the GBR corresponding to the service data flow.

3. The method according to claim 2, when there is a spare bandwidth resource in the first bearer, further comprising:
   allocating the spare bandwidth resource to the service data flow whose GBR is smaller than a maximum bit rate (MBR).

4. A quality of service (QoS) execution device, comprising:
   a processing hardware platform executing instructions stored on a non-transitory computer-readable storage medium, when the instructions are executed,
   the processing hardware platform obtains a first bearer and a service parameter corresponding to the first bearer; and
   performs a rate control process on a rate of a service data flow in the first bearer according to the service parameter,
   wherein the service parameter comprises service information, a quality of service class identifier (QCI), an allocation and retention priority (ARP), and a traffic flow template (TFT), and the service information comprises one or more of the followings: a service type, a transmission mechanism, and a transmission protocol,
   the processing hardware platform identifies the service data flow corresponding to the TFT in the first bearer;
   determines whether the service information corresponding to the service data flow satisfies the rate control condition;
   establishes a second bearer according to the QCI and the ARP corresponding to the service data flow satisfying the rate control condition; and
   binds the service data flow to the second bearer corresponding to the service data flow,
   wherein the rate control condition comprises one or more of the followings: a specific service type for establishing a new bearer, a specific transmission mechanism for establishing the new bearer, and a specific transmission protocol for establishing the new bearer.

5. A quality of service (QoS) execution device, comprising:
   a processing hardware platform executing instructions stored on a non-transitory computer-readable storage medium, when the instructions are executed,
   the processing hardware platform obtains a first bearer and a service parameter corresponding to the first bearer; and
   performs a rate control process on a rate of a service data flow in the first bearer according to the service parameter,
   wherein the service parameter comprises service information and a traffic flow template (TFT), and the service information comprises a guaranteed bit rate (GBR),
   the processing hardware platform identifies the service data flow corresponding to the TFT in the first bearer;
   determines whether the rate corresponding to the service data flow is larger than the GBR corresponding to the service data flow; and,
   configures the rate corresponding to the service data flow whose rate is larger than the GBR as the GBR corresponding to the service data flow.

6. The QoS execution device according to claim 5,
   when there is spare bandwidth resource in the first bearer the processing hardware platform allocates the spare bandwidth resource to at least one configured data flow whose GBR is smaller than a maximum bit rate (MBR).

7. A service rate control system, comprising:
   a packet data network gateway (PGW), and a policy and charging rules function (PCRF); and further comprising a quality of service (QoS) execution device, wherein the QoS execution device comprises: a processing hardware platform executing instructions stored on a non-transitory computer-readable storage medium, when the instructions are executed, the processing hardware platform obtains a first bearer and a service parameter corresponding to the first bearer; and performs a rate control process on a rate of a service data flow in the first bearer according to the service parameter, wherein the service parameter comprises service information, a quality of service class identifier (QCI), an allocation and retention priority (ARP), and a traffic flow template (TFT), and the service information comprises one or more of the followings: a service type, a transmission mechanism, and a transmission protocol, the processing hardware platform identifies the service data flow corresponding to the TFT in the first bearer;

determines whether the service information corresponding to the service data flow satisfies the rate control condition;

establishes a second bearer according to the QCI and the ARP corresponding to the service data flow satisfying the rate control condition; and binds the service data flow to the second bearer corresponding to the service data flow, wherein the rate control condition comprises one or more of the followings: a specific service type for establishing a new bearer, a specific transmission mechanism for establishing the new bearer, and a specific transmission protocol for establishing the new bearer.

8. A service rate control system, comprising:

A packet data network gateway (PGW), and a policy and charging rules function (PCRF); and further comprising a quality of service (QoS) execution device, wherein the QoS execution device comprises:

a processing hardware platform executing instructions stored on a non-transitory computer-readable storage e medium when the instructions are executed, the processing hardware platform obtains a first bearer and a service parameter corresponding to the first bearer; and performs a rate control process on a rate of a service data flow in the first bearer according to the service parameter, wherein the service parameter comprises service information and a traffic flow template (TFT), and the service information comprises a guaranteed bit rate (GBR), the processing hardware platform identifies the service data flow corresponding to the TFT in the first bearer;

determines whether the rate corresponding to the service data flow is larger than the GBR corresponding to the service data flow; and, configures the rate corresponding to the service data flow whose rate is larger than the GBR as the GBR corresponding to the service data flow.

9. The service rate control system according to claim 8, when there is spare bandwidth resource in the first bearer the processing hardware platform allocating unit is configured to allocates the spare bandwidth resource to at least one configured data flow whose GBR is smaller than a maximum bit rate (MBR).

10. The method according to claim 1, wherein the service parameter is obtained from one of a bearer modification message and a bearer establishment message.

11. The method according to claim 2, wherein the service parameter is obtained from one of a bearer modification message and a bearer establishment message.

12. The QoS execution device according to claim 4, wherein the service parameter is obtained from one of a bearer modification message and a bearer establishment message.

13. The QoS execution device according to claim 4, wherein the QoS execution device is one of an eNodeB and a UE.

14. The QoS execution device according to claim 5, wherein the service parameter is obtained from one of a bearer modification message and a bearer establishment message.

15. The QoS execution device according to claim 5, wherein the QoS execution device is one of an eNodeB and a UE.

16. The service rate control system according to claim 7, wherein the service parameter is obtained from one of a bearer modification message and a bearer establishment message.

17. The service rate control system according to claim 7, wherein the QoS execution device is one of an eNodeB and a UE.

18. The service rate control system according to claim 8, wherein the service parameter is obtained from one of a bearer modification message and a bearer establishment message.

19. The service rate control system according to claim 8, wherein the QoS execution device is one of an eNodeB and a UE.

* * * * *